Jan. 5, 1926.
A. N. MACNICOL
1,568,233
REENFORCEMENT FOR CONCRETE PIPES
Filed August 9, 1922
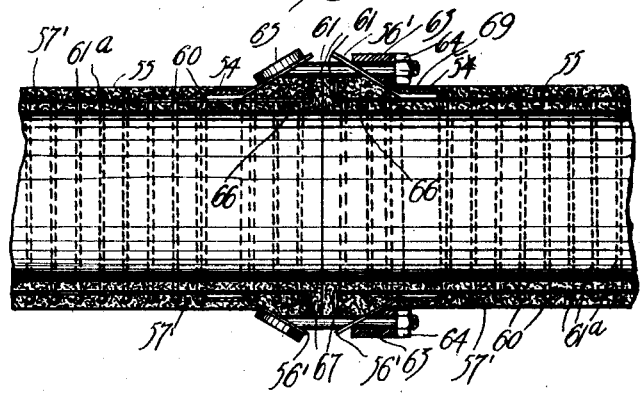
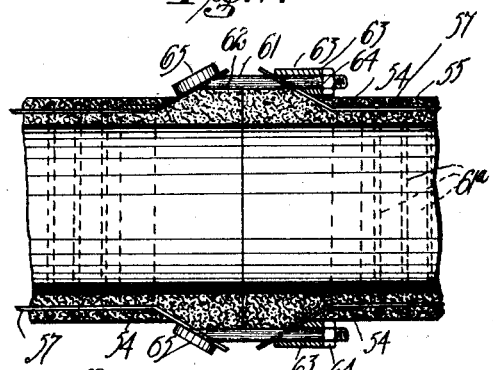
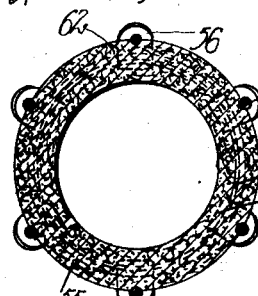
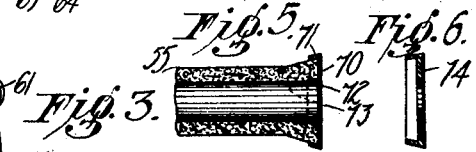
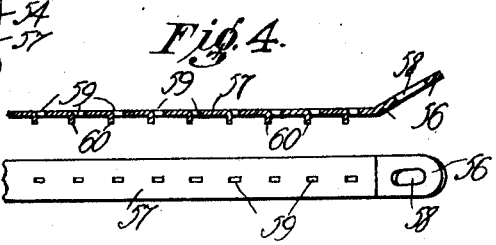
Inventor:
ARNOLD NESBITT MACNICOL.
PER
Attorney.

Patented Jan. 5, 1926.

1,568,233

UNITED STATES PATENT OFFICE.

ARNOLD NESBITT MACNICOL, OF MELBOURNE, VICTORIA, AUSTRALIA.

REENFORCEMENT FOR CONCRETE PIPES.

Application filed August 9, 1922. Serial No. 580,729.

*To all whom it may concern:*

Be it known that ARNOLD NESBITT MACNICOL, a citizen of the Commonwealth of Australia, and resident of 31 Queen Street, Melbourne, in the State of Victoria, Commonwealth of Australia, has invented certain new and useful Reenforcements for Concrete Pipes, of which the following is a specification.

This invention relates to improvements in the manufacture of pipes and other forms and has been devised in order to provide reenforcing mechanism and jointing which will be of great utility.

The essential feature embodied in the invention consists in reenforcing the pipes or other shapes by means of two or more rings connected to which is a longitudinal flat bar with a long slotted hole at the ends, the ends being bent outwardly past the surface of the pipe and the adjacent pipes at the ends being bolted together to enable a simple gasket joint to be made.

A further essential feature consists in punching the bars along their length to produce projections extending outwardly so that when the usual spiral reenforcement is would round them the projections may be pressed over the spiral reenforcement to keep it in position.

In order that the invention may be more readily understood it will now be described with reference to the accompanying drawings in which:—

Figure 1 is a view in vertical central section of one form of reenforcing the pipes or forms.

Figure 2 is a view of a modified reenforcement construction.

Figure 3 is an end view of a pipe reenforced according to this invention.

Figure 4 illustrates views in section and plan of the reenforcing bars.

Figure 5 is a view in section of a metal cap piece fitted to the pipe end.

Figure 6 is a view in section of the metal cap piece.

As illustrated in Figures 1 to 5 a special joint and reenforcement is provided for the pipes, and this reenforcement, as illustrated in Figure 1, consists in the use of two or more rings 54 spaced inside the pipe 55 and particularly at the point where it connects the outwardly turned ends 56 of spaced longitudinal bars 57, which are attached to the rings by spot welding, rivets or clamps.

These bars 57 are punched, as at 58, to provide an elongated slot in the out-turned ends 56 and are also preferably punched at 59 along their length so as to produce projections 60 extending outwardly, so that, when the usual spiral reenforcement 61ª is wound round the bars, the projections 60 may be hammered or pressed over this spiral reenforcement to keep it in position.

The bars 57 near their ends are bent outwardly as at 56 at a small angle so that they come through the outside surface of the pipe.

The elongated hole 58 is made near the end of this end portion 56 so that a bolt 61 may be passed through parallel to the centre line of the pipe to connect the end of the bar to that in the adjacent pipe when they are laid, the bolt preferably seating in grooves 62 formed in the surface of the pipe ends.

In order that the bolt 61 may be screwed up without trouble a fitting washer 63 may be placed on the bolt on the nut end to enable the nut to be screwed up against a surface at right angles to the axis of the bolt 61.

The end of the washer 63 remote from the nut 64 is made to suit the angle of the longitudinal bars 57, and the head 65 of the bolt 61 is forged at the correct angle, or, alternatively, a fitting member may be used as at the nut end.

In the construction illustrated in Figure 2 the longitudinal bars 57' are continued at the ends 66 almost to the pipe ends, being bent outwardly at the ends 67 at right angles, and these bars 57' are spot welded to the longitudinal ends 69 of metal strips formed with the angle pieces 56', which latter are provided with the slots 58 through which the bolt 61 passes in the manner above described, the angle strips being in turn spot welded to the rings 54.

In this manner the longitudinal members act as a continuous tension bar throughout the pipe line and enable a simple gasket joint to be made, the end rings 54 serving the function of taking the stress on the tightening of the bolts and so prevent the cracking of the pipes.

The ends of the pipes are preferably enlarged so that a rubber, bitumen, lead or other suitable joint may be used.

Metal caps 70 with an external flange 71, and, if desired, an internal flange 72, embedded in the internal surface 73 of the pipe 55, may be fitted to the ends of the pipes during the process of manufacture, so that when the pipes are bolted together the pressure is evenly distributed over the end of the pipe.

In manufacturing certain pipes such, as gas pipes, the cap 70 may be formed with circumferential corrugations 74.

I desire it to be understood that various improvements and modifications may be embodied without departing from the spirit and scope of the invention.

What I claim as my invention and desire to secure by Letters Patent is:—

1. In concrete pipes, a reenforcement and jointing means comprising reenforcement rings, spaced horizontal bars connected thereto and having their ends bent so as to project at a small angle through the surface of the pipe, and means for connecting such projections on adjacent pipes.

2. In concrete pipes, a reenforcement and jointing means comprising rings, spaced bars connected thereto extending longitudinally of the pipe with the ends bent outwardly at a small angle to project through the surface of the pipe, a bolt passing through adjacent ends to connect adjacent pipes, and a fitting piece between the angle surface of the pipe and the nut end of the bolt.

3. In concrete pipes, a reenforcement and jointing means comprising reenforcement rings, spaced horizontal bars extending longitudinally of the pipe with their ends bent outwardly at a small angle to project through the surface of the pipe, outwardly-disposed projections disposed at intervals on said bars, and means for connecting the projecting ends of said bars on abutting pipes.

Signed at Melbourne, Victoria, Australia, this 7th day of July, 1922.

ARNOLD NESBITT MACNICOL.